3,316,236
SEPARATION OF AMINE OXIDES BY UREA ADDUCT FORMATION
Charles M. Starks, Ponca City, Okla., and Kenneth E. Harwell, Overland Park, Kans., assignors to Continental Oil Company, Ponca City, Okla., a corporation of Delaware
No Drawing. Filed May 23, 1966, Ser. No. 551,875
10 Claims. (Cl. 260—96.5)

This invention relates to the preparation of amine oxide compounds. More specifically, it is concerned with the separation of amine oxide compounds from aqueous mixtures.

Tertiary amines react with a variety of oxidizing agents to give amine oxides, thus:

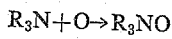

$$R_3N + O \rightarrow R_3NO$$

The R-groups may be alkyl, benzyl, aromatic, heterocyclic, etc., although the ease of oxidation is greatly influenced by the nature of the R-groups.

One method of preparing an amine oxide is to weigh the amine into a reactor which is set in a constant temperature water bath. Hydrogen peroxide is added to the reactor with stirring from time to time. As the reaction between the amine and the hydrogen peroxide proceeds, the reaction mass normally becomes viscous and begins to gel. At this point, the addition of water to the reactor is begun, and enough water is added from time to time to dissolve the gel formed. At the end of the reaction the excess hydrogen peroxide is decomposed by adding a reducing agent, and the reactant mass is cooled to room temperature. The resulting product is an amine oxide which exists in the form of a clear aqueous solution.

Oxidation of amines with hydrogen peroxide produces a reaction product which contains 20 to 30 percent amine oxide in an aqueous solution. For shipping or for use in dry formulations, the water must be removed. Since many of the amine oxides are excellent foaming and foam stabilizing agents and are thermally sensitive, removal of this much water presents difficulties. A number of concentration techniques are available, but each of these is beset by operational difficulties. Ordinary distillation methods are hampered by the formation of large volumes of stable, sticky foam. Surface evaporation enables concentrations up to 85 percent amine oxide but is time-consuming. Drum drying is used, but, because amine oxides are susceptible to thermal decomposition at higher temperatures, drying conditions must be carefully controlled. Spray drying is almost completely unsuccessful. Desiccator drying, although applicable to small quantities in laboratories, is not readily adaptable to industrial processes.

An object of this invention is to provide a method of removing amine oxides from aqueous solution.

Another object of this invention is to provide a method of removing amine oxides from aqueous solutions containing also a low molecular weight alcohol.

Broadly stated, this invention is a method of removing amine oxides from aqueous solution comprising adding urea to an aqueous solution of amine oxide, whereupon a solid urea-amine oxide adduct forms, and recovering the adduct so formed from the aqueous solution.

One aspect of this invention is concerned with recovering amine oxides in the detergent range which come from the oxidizing reactor as a 20 percent to 30 percent solution in water. Detergent range amine oxides are defined as those where each alkyl group is a straight chain of 8 to 18 carbon atoms. In practicing this aspect of the invention, we mix a solution of urea and water with the aqueous solution of amine oxide from the reactor. We prefer to use a saturated solution of urea in water, but solutions of less concentration can be used. Alternatively, solid, finely divided urea can be added to the solution of amine oxide, but adding the urea in a liquid solution is preferred. The urea solution is added preferably at room temperature, and the mixture is allowed to stand until granular crystals of the amine oxide urea adduct form. These are recovered by filtration or decantation and dried.

It is usually advantageous to manufacture amine oxides in a water solution containing up to 50 percent of ethyl alcohol or other low molecular weight alcohol. The urea adduct of amine oxide forms even more readily in a water-alcohol mixture than in a water mixture alone. Thus, the adduct separation process of our invention is equally applicable to amine oxide reactor product containing alcohol.

Example 1

A volume of 50 milliliters of a saturated aqueous solution of urea (saturated at 17° C.) was mixed with 30 milliliters of a 30 percent aqueous solution of N,N-dimethyl dodecylamine oxide and N,N-dimethyl tetradecylamine oxide. Upon standing at room temperature, a waxy solid appeared. On cooling to about 10° C., additional solid formed. The urea adduct thus formed was collected on a filter and air dried. When some of this solid adduct was shaken with water, profuse foaming occurred, showing the presence and activity of amine oxide in the solid.

Example 2

The procedure of Example 1 was repeated except that 20 milliliters of methanol were added to the 30 milliliters of 30 percent aqueous solution of amine oxides.

Example 3

To illustrate the effectiveness of the amine oxide adduct in a detergent formulation, tests were made with a heavy-duty detergent formulation and a light-duty one. The detergent formulation was one in which an amine oxide adduct having an average of 14 carbon atoms per alkyl group was used as a foam stabilizer. Comparison tests were made with identical detergent formulations incorporating unadducted amine oxide of the same composition. The four detergent formulations were then subjected to a dishwashing test in concentrations of 50 p.p.m. and 300 p.p.m. detergent for both the heavy-duty and the light-duty formulations. The results are tabulated below:

| | Average Number of Plates Washed | | | |
|---|---|---|---|---|
| | Heavy-Duty Detergent | | Light-Duty Detergent | |
| | 50 p.p.m. | 300 p.p.m. | 50 p.p.m. | 300 p.p.m. |
| Adducted Amine Oxide | 27 | 29.8 | 19.3 | 16.75 |
| Unadducted Amine Oxide | 26.75 | 29.5 | 19.3 | 16.75 |

It is obvious from the preceding data that an amine oxide adduct does not inhibit detergency of a detergent formulation using it.

From the foregoing disclosure it will be apparent that an improved method of removing amine oxides from aqueous solutions has been achieved. The method presented enables a rapid and relatively simple method of separating the amine oxide. The amine oxide adduct obtained is equal in utility to the amine oxide, particularly in detergent formulations.

Certain modifications of the invention will be apparent to those skilled in the art, and the illustrative details disclosed are not to be construed as imposing unnecessary limitations on the invention.

We claim:
1. A method of removing amine oxides from aqueous solution which comprises:
   (a) combining said aqueous solution of amine oxide with an aqueous solution of urea, whereby a solid urea-amine oxide adduct is formed, and
   (b) recovering said adduct from said solution.
2. The method of claim 1 wherein the solid urea-amine oxide adduct of step (a) is recovered from said solution by filtering.
3. The method of claim 1 wherein the dissolved amine oxide is of the general formula $(R)_3NO$, R being a straight chain alkyl group having between about 8 and about 18 carbon atoms.
4. The method of claim 1 wherein the aqueous solution of amine oxide of step (a) contains in addition a low-molecular weight alcohol.
5. The method of claim 4 wherein said alcohol is ethanol.
6. The method of claim 4 wherein said alcohol is methanol.
7. The method of claim 1 wherein the amine oxides comprise N,N-dimethyl dodecylamine oxide.
8. The method of claim 1 wherein the amine oxides comprise N,N-dimethyl tetradecylamine oxide.
9. The method of claim 1 wherein the mixture resulting from step (a) is cooled to a temperature less than 75° F. prior to step (b).
10. The method of claim 1 wherein after step (b) the recovered urea-amine oxide adduct is dried.

References Cited by the Examiner
UNITED STATES PATENTS
2,681,336  6/1954  Gorin _____ 260—96.5

ALEX MAZEL, Primary Examiner.
HENRY R. JILES, Examiner.